United States Patent
Chiang et al.

(10) Patent No.: US 8,284,316 B2
(45) Date of Patent: Oct. 9, 2012

(54) REAL-TIME IMAGE PROCESSING CIRCUIT CAPABLE OF ENHANCING BRIGHTNESS CONTRAST AND COLOR SATURATION

(75) Inventors: Tsung-Hsi Chiang, Hsinchu County (TW); Ching-Fang Hsiao, Hsinchu County (TW)

(73) Assignee: ILI Technology Corporation, Jhubei, Hsinchu County (TW)

( * ) Notice: Subject to any disclaimer, the term of this patent is extended or adjusted under 35 U.S.C. 154(b) by 193 days.

(21) Appl. No.: 12/924,450

(22) Filed: Sep. 28, 2010

(65) Prior Publication Data

US 2011/0228168 A1 Sep. 22, 2011

(30) Foreign Application Priority Data

Mar. 17, 2010 (TW) ............................... 99107763 A (51) Int. Cl.
*H04N 9/68* (2006.01)
*H04N 9/64* (2006.01)
*H04N 5/57* (2006.01)

(52) U.S. Cl. ......... 348/645; 348/649; 348/672; 348/687

(58) Field of Classification Search .................. 348/645, 348/646, 649, 651, 672, 673, 687, 703; 382/167, 382/168, 274, 275; 345/604, 617, 600; *H04N 9/68, 9/64, 5/14, 5/57*

See application file for complete search history.

(56) References Cited

U.S. PATENT DOCUMENTS

| 5,452,017 A * | 9/1995 | Hickman ....................... 348/646 |
| 7,933,469 B2 * | 4/2011 | Shehata et al. ................ 382/274 |
| 2011/0110588 A1 * | 5/2011 | Xie et al. ....................... 382/167 |

* cited by examiner

*Primary Examiner* — Sherrie Hsia
(74) *Attorney, Agent, or Firm* — Sheppard, Mullin, Richter & Hampton LLP (57) ABSTRACT

A real-time image processing circuit includes: a first converting unit for converting an input image frame into hue data, first saturation data and first luminance data; a saturation processing unit operable to adjust the first saturation data based on saturation mapping information to generate second saturation data corresponding to the input image frame and having a saturation distribution range larger than that of the first saturation data; a luminance processing unit operable to adjust the first luminance data based on luminance mapping information to generate second luminance data corresponding to the input image frame and having a luminance distribution range larger than that of the first luminance data; and a second converting unit for converting the hue data, the second saturation data and the second luminance data into an output image frame corresponding to the input image frame and outputting the output image frame.

5 Claims, 8 Drawing Sheets

REAL-TIME IMAGE PROCESSING CIRCUIT CAPABLE OF ENHANCING BRIGHTNESS CONTRAST AND COLOR SATURATION

CROSS-REFERENCE TO RELATED APPLICATION

This application claims priority of Taiwanese Application No. 099107763, filed on Mar. 17, 2010.

BACKGROUND OF THE INVENTION

1. Field of the Invention

The invention relates to an image processing circuit, and more particularly to a real-time image processing circuit capable of enhancing brightness contrast and color saturation.

2. Description of the Related Art

A conventional image enhancing circuit usually processes a color image signal using the RGB color model. However, in RGB domain, red, green and blue components of the color image signal are processed independently without keeping the value of the red-to-green-to-blue ratio unchanged during the image processing. Therefore, it is usually resulting in visual color deviation or distortion of the color image signal.

For other conventional image enhancing techniques, an image frame may be divided into a plurality of sub-image blocks to conveniently process each smaller block each time or several blocks a time in parallel. Then, an image corresponding to the image frame can be obtained by putting all the processed sub-image blocks together. In such kind of image processing, a large number of complicated operations and a substantial amount of memory buffer are required for each sub-image block. While considering the real-time image processing, it is really not practical to implement. Therefore, improvements may be made in the above techniques.

SUMMARY OF THE INVENTION

Therefore, an object of the present invention is to provide a real-time image processing circuit that can enhance brightness contrast and color saturation and that can overcome the aforesaid disadvantages of the prior art.

According to the present invention, a real-time image processing circuit comprises:

a first converting unit adapted to receive an input image frame including a plurality of pixels, converting the input image frame received thereby into hue data, first saturation data and first luminance data, and outputting the hue data, the saturation data and the luminance data;

a saturation processing unit coupled to the first converting unit for receiving the first saturation data therefrom, and operable to adjust the first saturation data based on saturation mapping information to generate second saturation data corresponding to the input image frame, the second saturation data having a saturation distribution range larger than that of the first saturation data;

a luminance processing unit coupled to the first converting unit for receiving the first luminance data therefrom, and operable to adjust the first luminance data based on luminance mapping information to generate second luminance data corresponding to the input image frame, the second luminance data having a luminance distribution range larger than that of the first luminance data; and a second converting unit coupled to the first converting unit, the saturation processing unit and the luminance processing unit for receiving respectively the hue data, the second saturation data and the second luminance data therefrom, converting the hue data, the second saturation data and the second luminance data received thereby into an output image frame corresponding to the input image frame, and outputting the output image frame.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
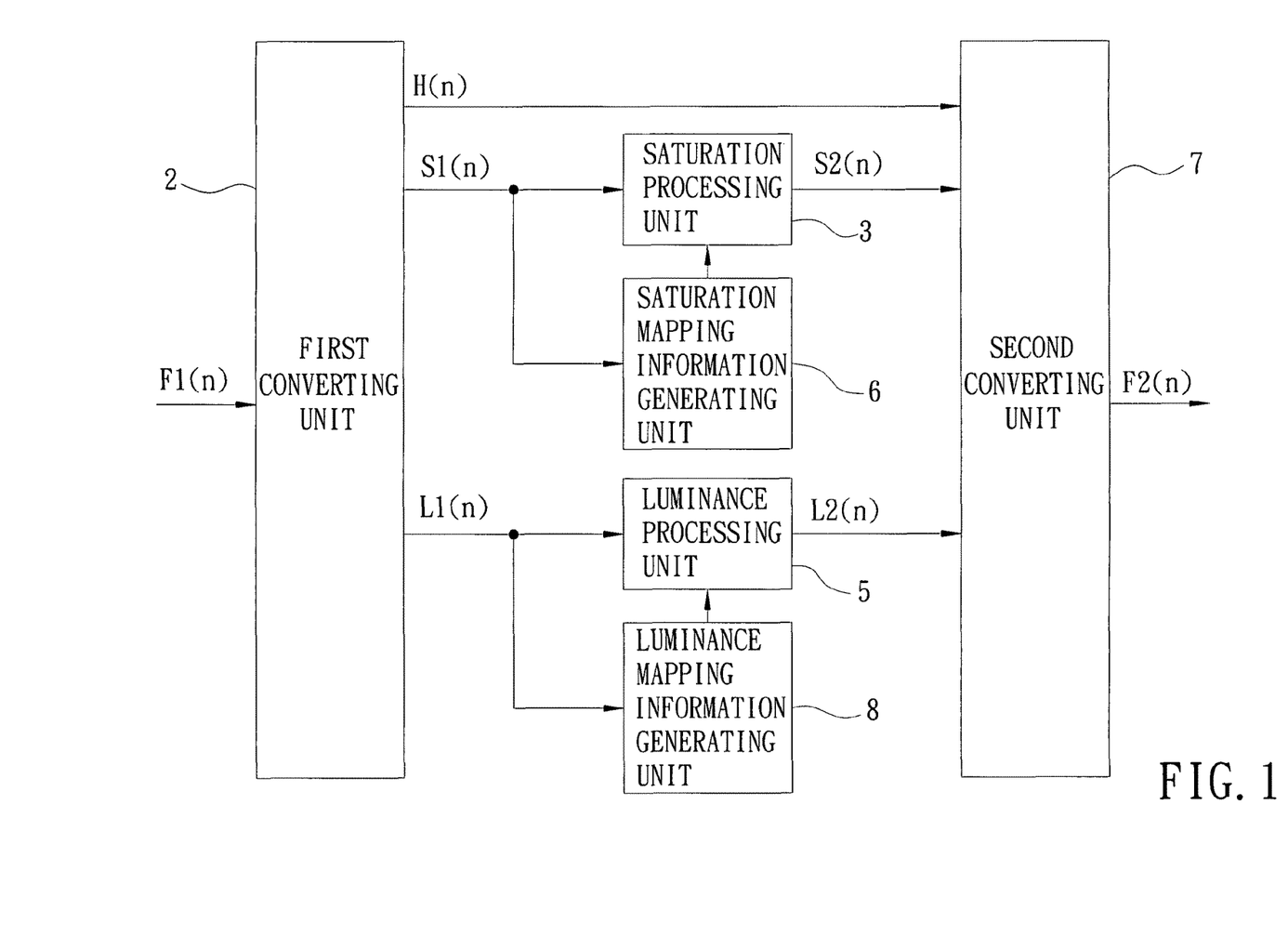
FIG. 1 is a schematic circuit block diagram illustrating the preferred embodiment of a real-time image processing circuit according to the present invention.

Referring to FIG. 1, the preferred embodiment of a real-time image processing circuit according to the present invention is shown to include a first converting unit 2, a saturation processing unit 3, a saturation mapping information generating unit 6, a luminance processing 5, a luminance mapping information generating unit 8, and a second converting unit 7. In this embodiment, the real-time image processing circuit is adapted to process a series of input image frames (F1). Each input image frame (F1) includes a plurality of pixels, each of which has red, green and blue components.

Figure 3:
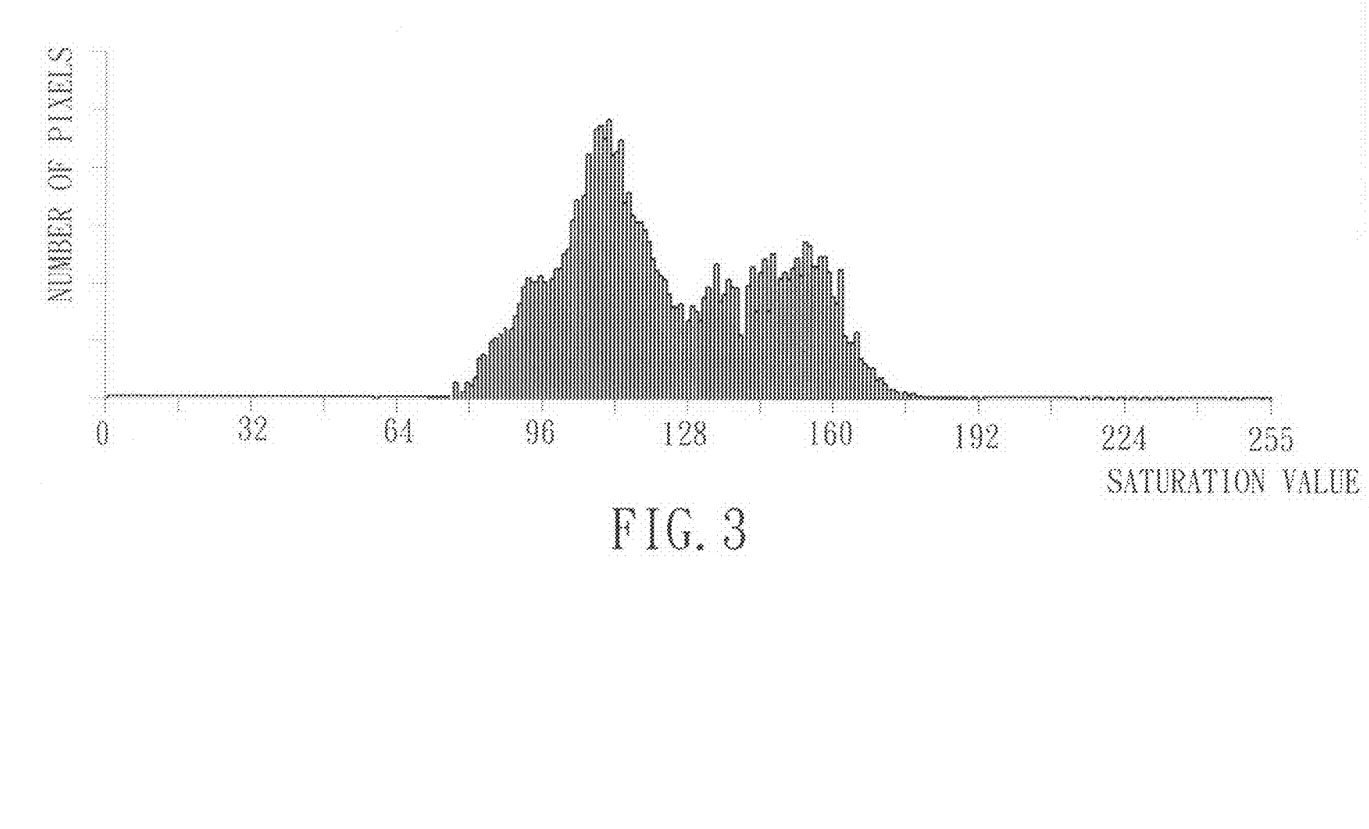
FIG. 3 is a histogram distribution plot of first saturation data from a first converting unit of the preferred embodiment.
Figure 6:
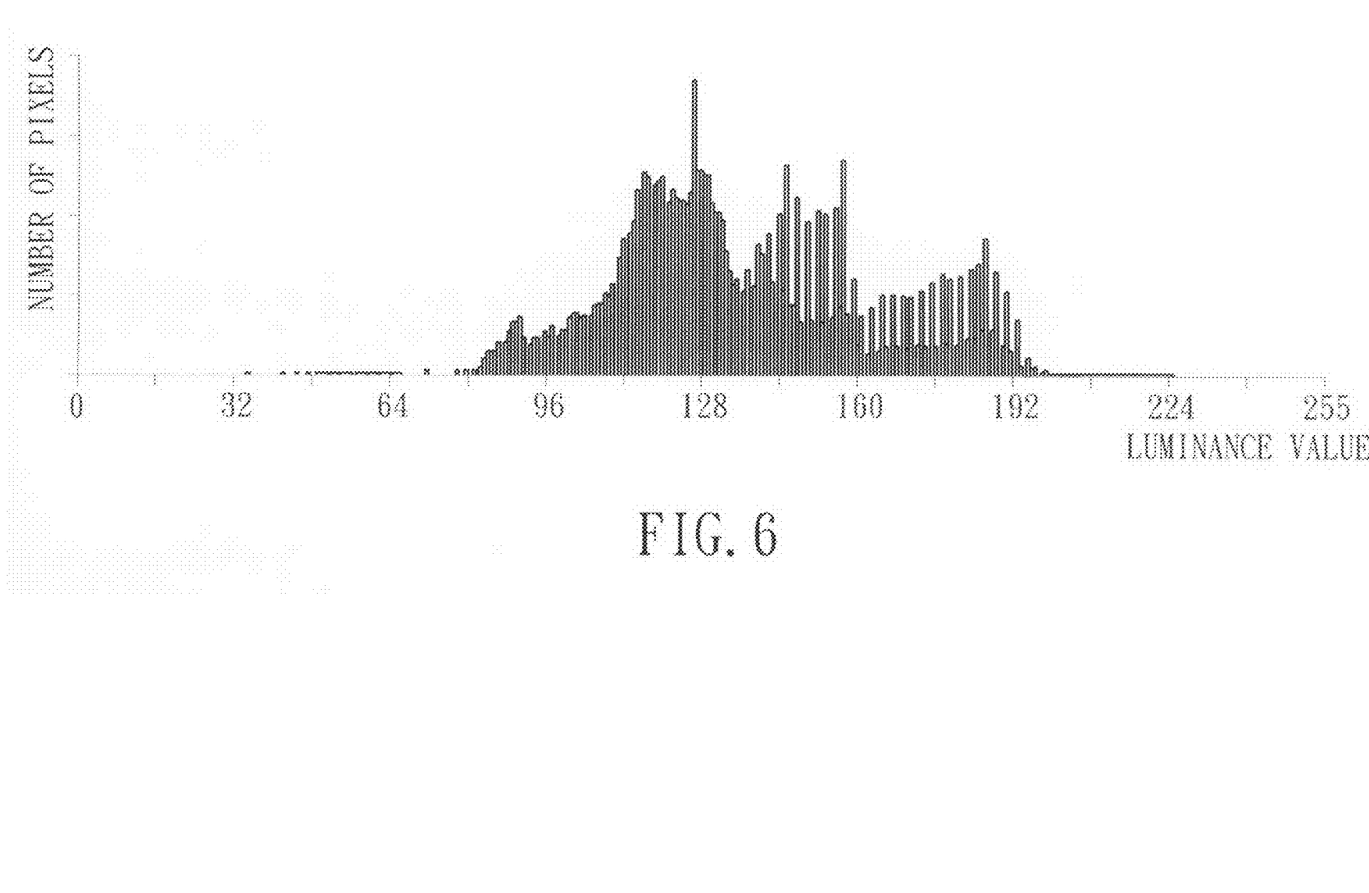
FIG. 6 is a histogram distribution plot of first luminance data from the first converting unit of the preferred embodiment.

When a current one of the input image frames (F1) indicated by F1(n), where n is a positive integer, is input to the first converting unit 2, the first converting unit 2 receives the current input image frame F1(n), and converts the current input image frame F1(n) into hue data H(n), first saturation data S1(n) and first luminance data L1(n) in a known manner. The hue data H(n) includes a plurality of hue values corresponding respectively to the pixels of the current input image frame F1(n). The first saturation data S1(n) includes a plurality of saturation values corresponding respectively to the pixels of the current input image frame F1(n). The first luminance data L1(n) includes a plurality of luminance values corresponding respectively to the pixels of the current input image frame F1(n). In this embodiment, each of the hue, saturation and luminance values is an integer value ranging from 0 to 255. For example, FIG. 3 illustrates a histogram distribution of the first saturation data S1(n), and FIG. 6 illustrates a histogram distribution of the first luminance data L1(n).

The saturation mapping information generating unit 6 is coupled to the first converting unit 2 for receiving the first saturation data S1(n) therefrom, stores saturation mapping information therein, and outputs the saturation mapping information stored therein upon receiving the first saturation data S1(n) from the first converting unit 2. Thereafter, the saturation mapping information generating unit 6 is operable to generate, based on the first saturation data S1(n) received thereby, current saturation mapping information that corresponds to the current input image frame F1(n), and updates the saturation mapping information stored therein with the current saturation mapping information generated thereby prior to receipt of first saturation data S1(n+1) corresponding to a next one of input image frames, i.e., the input image frame F1(n+1). In this embodiment, the saturation mapping information stored in the saturation mapping information generating unit 6 is in the form of a histogram mapping table.

Figure 2:
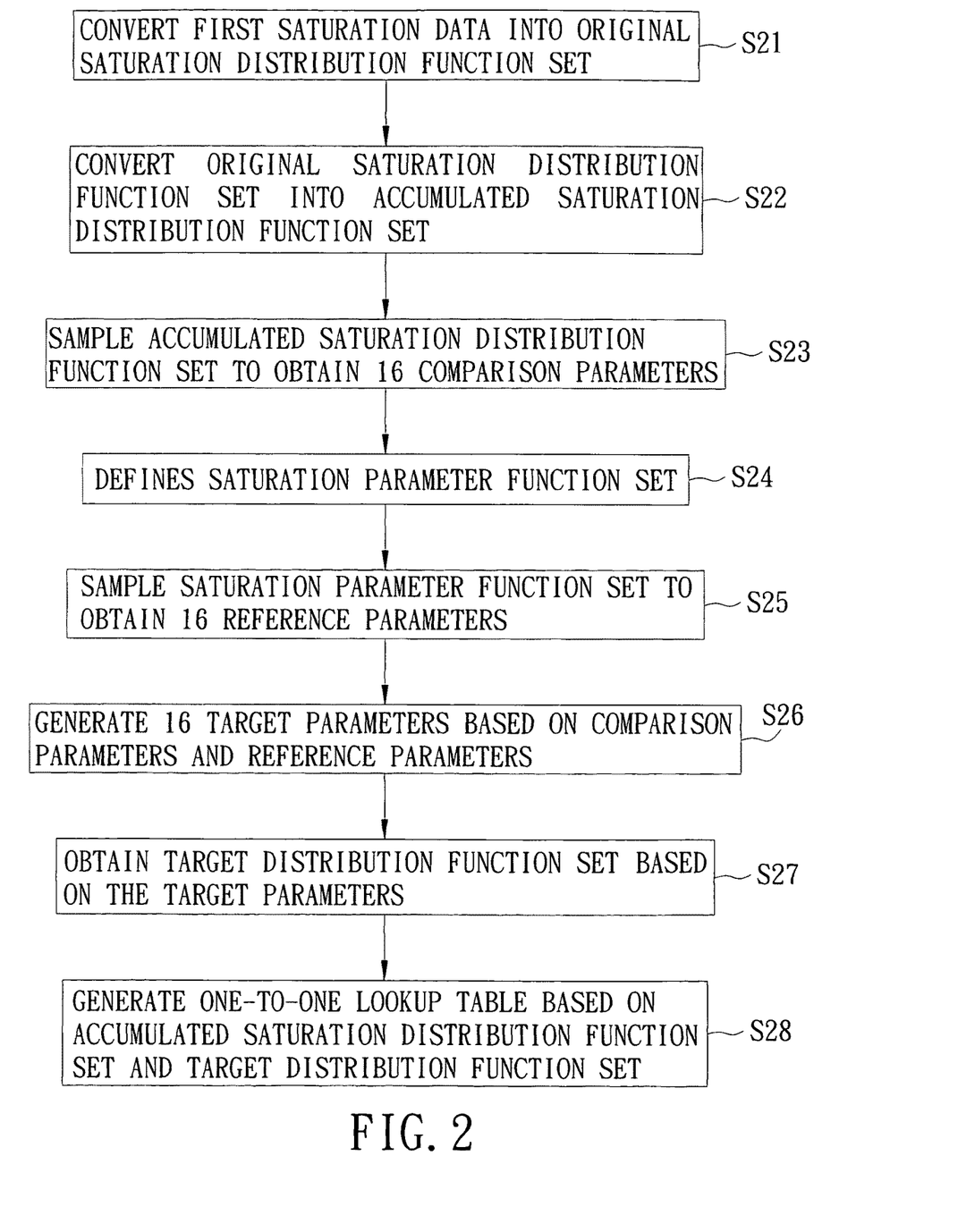
FIG. 2 is a flow chart of a method of generating current saturation mapping information performed by a saturation mapping information generating unit of the preferred embodiment.

FIG. 2 is a flow chart of a method of generating the current saturation mapping information performed by the saturation mapping information generating unit 6.

In step S21, the saturation mapping information generating unit 6 converts the first saturation data S1(n) into an original saturation distribution function set of the number of the pixels of the current input image frame F1(n) relative to saturation strength, i.e., the saturation values.

Figure 4:
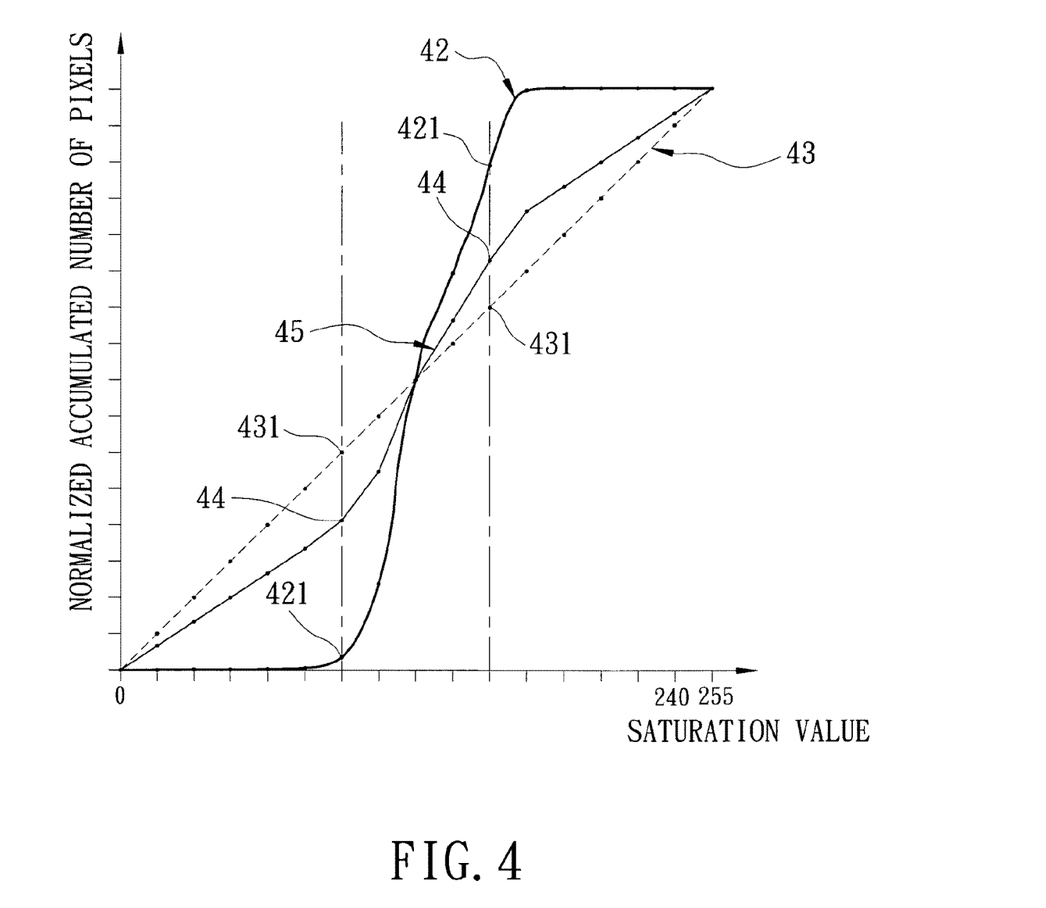
FIG. 4 is a plot illustrating a saturation cumulative distribution function set, a saturation parameter function set and a target distribution function set obtained by the saturation mapping information generating unit according to the method of FIG. 2.

In step S22, the saturation mapping information generating unit 6 converts the original saturation distribution function set into a saturation cumulative distribution function set, as indicated by a curve 42 of FIG. 4.

In step S23, the saturation mapping information generating unit 6 samples equidistantly the saturation cumulative distribution function set in accordance with saturation strength to obtain a number (N) of comparison parameters 421, where N=16 in this example.

In step S24, the saturation mapping information generating unit 6 defines a saturation parameter function set corresponding to the saturation cumulative distribution function set obtained in step S22, as indicated by a curve 43 of FIG. 4. The curve 43 is an oblique line starting from the origin of the coordinates.

In step S25, the saturation mapping information generating unit 6 samples equidistantly the saturation parameter function set in accordance with saturation strength to obtain sixteen reference parameters 431.

In step S26, the saturation mapping information generating unit 6 generates sixteen target parameters based on the comparison parameters 421 and the reference parameters 431. In this embodiment, when one comparison parameter 421 is less than a corresponding reference parameter 431, a corresponding target parameter 44 is obtained by subtracting a product of a predetermined first ratio and the difference between said one reference parameter 431 and the corresponding comparison parameter 421 from said one reference parameter 431. When one comparison parameter 421 is greater than a corresponding reference parameter 431, a corresponding target parameter 44 is obtained by adding a product of a predetermined second ratio and the difference between the corresponding comparison parameter 421 and said one reference parameter 431 to said one reference parameter 431. The first and second ratios range from 0 to 100%.

In step S27, the saturation mapping information generating unit 6 obtains a target distribution function set, as indicated by a curve 45 of FIG. 4, based on the target parameters 44 generated in step S26.

In step S28, the saturation mapping information generating unit 6 generates a one-to-one lookup table based on the saturation cumulative distribution function set and the target distribution function set. The one-to-one lookup table serves as the current saturation mapping information.

Figure 7:
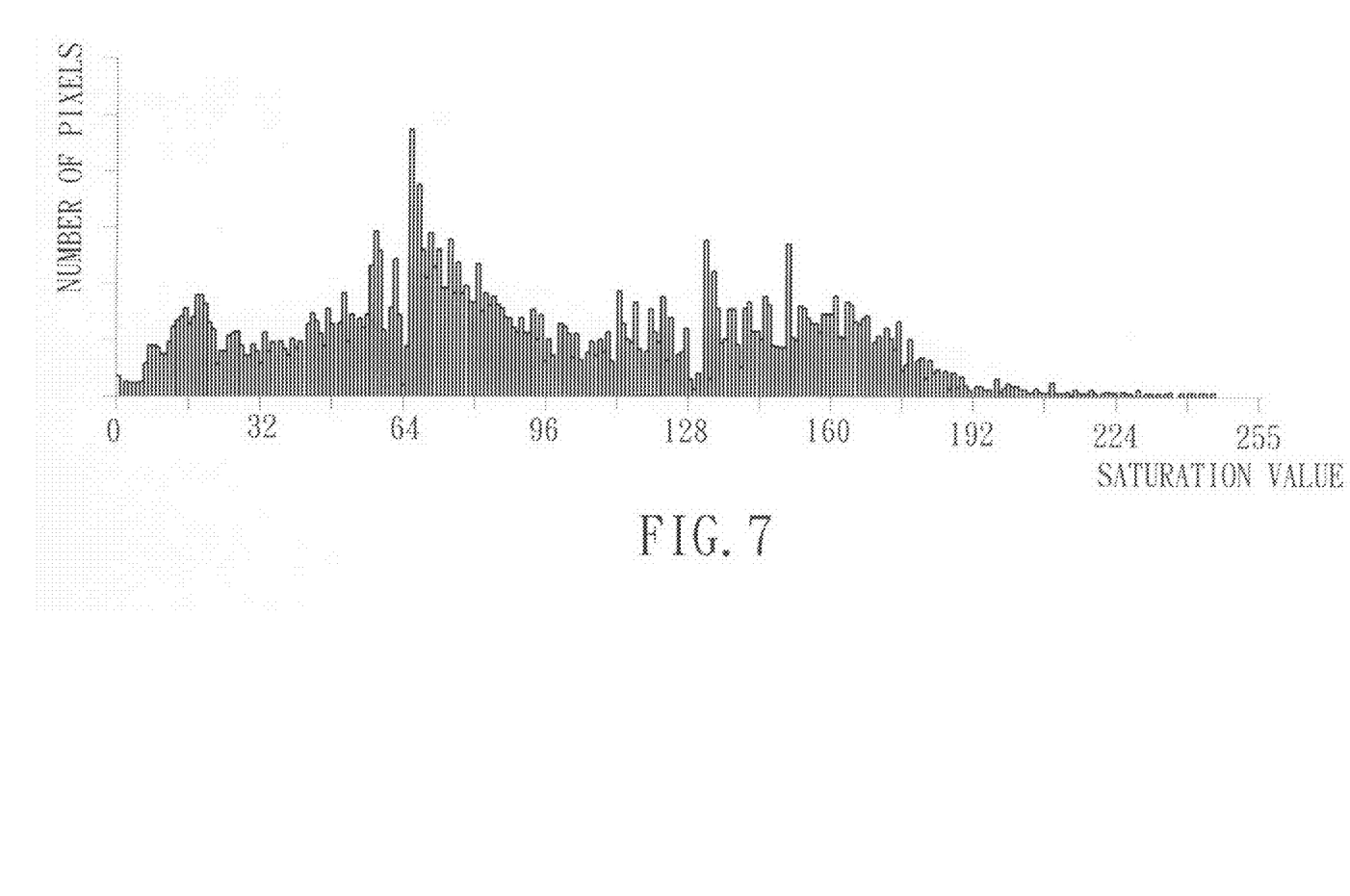
FIG. 7 is a histogram distribution plot of second saturation data generated by a saturation processing unit of the preferred embodiment.

The saturation processing unit 3 is coupled to the first converting unit 2 and the saturation mapping information generating unit 6 for receiving the first saturation data S1(n) and the saturation mapping information therefrom. The saturation processing unit 3 is operable to adjust the first saturation data S1(n) based on the saturation mapping information received thereby to generate second saturation data S2(n) corresponding to the current input image frame F1(n). According to the above example, FIG. 7 illustrates a histogram distribution of the second saturation data S2(n). As compared to the histogram distribution of the first saturation data S1(n) shown in FIG. 3, the second saturation data S2(n) has a saturation distribution range larger than that of the first saturation data S1(n).

It is noted that, when the current input image frame F1(n) is a first one of the input image frames F1, i.e., n=1, the saturation mapping information output from the saturation mapping information generating unit 6 to the saturation processing unit 3 is predetermined saturation mapping information. When the current input image frame F1(n) is not the first one of the input image frames F1, i.e., n>1, the saturation mapping information output from the saturation mapping information generating unit 6 to the saturation processing unit 3 is generated in accordance with first saturation data S1(n−1) of a previous one of the input image frames, i.e., the input image frame F1(n−1), where n is an integer greater than one.

The luminance mapping information generating unit 8 is coupled to the first converting unit 2 for receiving the first luminance data L1(n) therefrom, stores luminance mapping information therein, and outputs the luminance mapping information stored therein upon receiving the first luminance data L1(n) from the first converting unit 2. Thereafter, the luminance mapping information generating unit 8 is operable to generate, based on the first luminance data L1(n) received thereby, current luminance mapping information that corresponds to the current input image frame F1(n), and updates the luminance mapping information stored therein with the current luminance mapping information generated thereby prior to receipt of first luminance data L1(n+1) corresponding to the next one of input image frames, i.e., the input image frame F1(n+1). In this embodiment, the luminance mapping information stored in the luminance mapping information generating unit 8 is in the form of a histogram mapping table.

Figure 5:
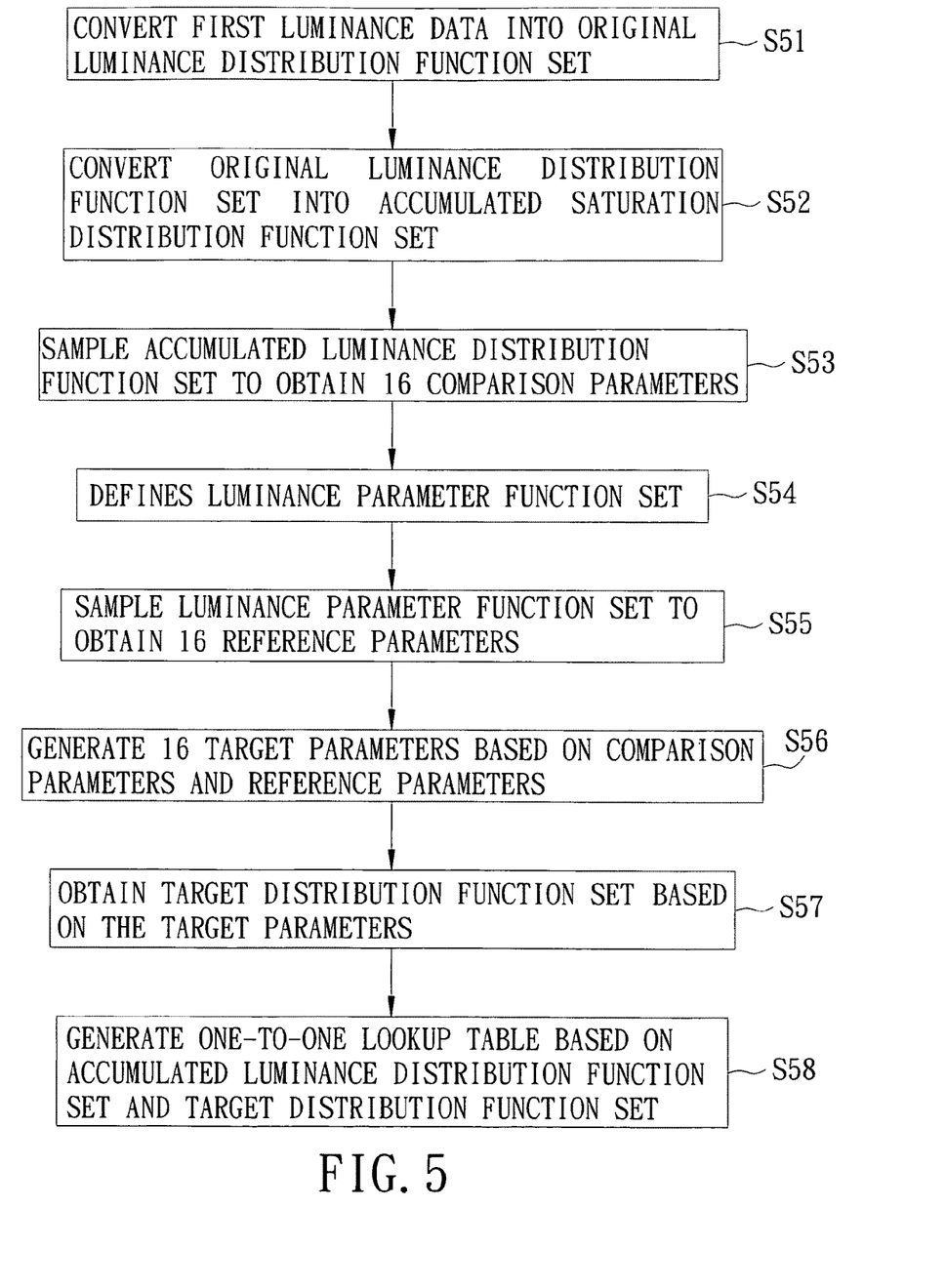
FIG. 5 is a flow chart of a method of generating current luminance mapping information performed by a luminance mapping information generating unit of the preferred embodiment.

FIG. 5 is a flow chart of a method of generating the current luminance mapping information performed by the luminance mapping information generating unit 8. The method of generating the current luminance mapping information is similar to the method of generating the current saturation mapping information.

In step S51, the luminance mapping information generating unit 8 converts the first luminance data L1(n) into an original luminance distribution function set of the number of the pixels of the current input image frame F1(n) relative to luminance strength, i.e., the luminance values.

In step S52, the luminance mapping information generating unit 8 converts the original luminance distribution function set into a luminance cumulative distribution function set.

In step S53, the luminance mapping information generating unit 8 samples equidistantly the luminance cumulative distribution function set in accordance with luminance strength to obtain a number (P) of comparison parameters, wherein P=16 in this example.

In step S54, the luminance mapping information generating unit 8 defines a luminance parameter function set corresponding to the luminance cumulative distribution function set obtained in step L22.

In step S55, the luminance mapping information generating unit 8 samples equidistantly the luminance parameter function set in accordance with luminance strength to obtain sixteen reference parameters.

In step S56, the luminance mapping information generating unit 8 generates sixteen target parameters based on the comparison parameters obtained in step S53, and the reference parameters obtained in step S55. In this embodiment, when one comparison parameter obtained in step S53 is less than a corresponding reference parameter obtained in step S55, a corresponding target parameter is obtained by subtracting a product of a predetermined third ratio and the difference between said one reference parameter and the corresponding comparison parameter from said one reference parameter. When one comparison parameter is greater than a corresponding reference parameter, a corresponding target parameter is obtained by adding a product of a predetermined fourth ratio and the difference between the corresponding comparison parameter and said one reference parameter to said one reference parameter. The third and fourth ratios range from 0 to 100%.

In step S57, the luminance mapping information generating unit 8 obtains a target distribution function set based on the target parameters 44 generated in step S56.

In step S58, the luminance mapping information generating unit 8 generates a one-to-one lookup table based on the luminance cumulative distribution function set and the target distribution function set obtained in step S57. The one-to-one lookup table generated in step S58 serves as the current luminance mapping information.

Figure 8:
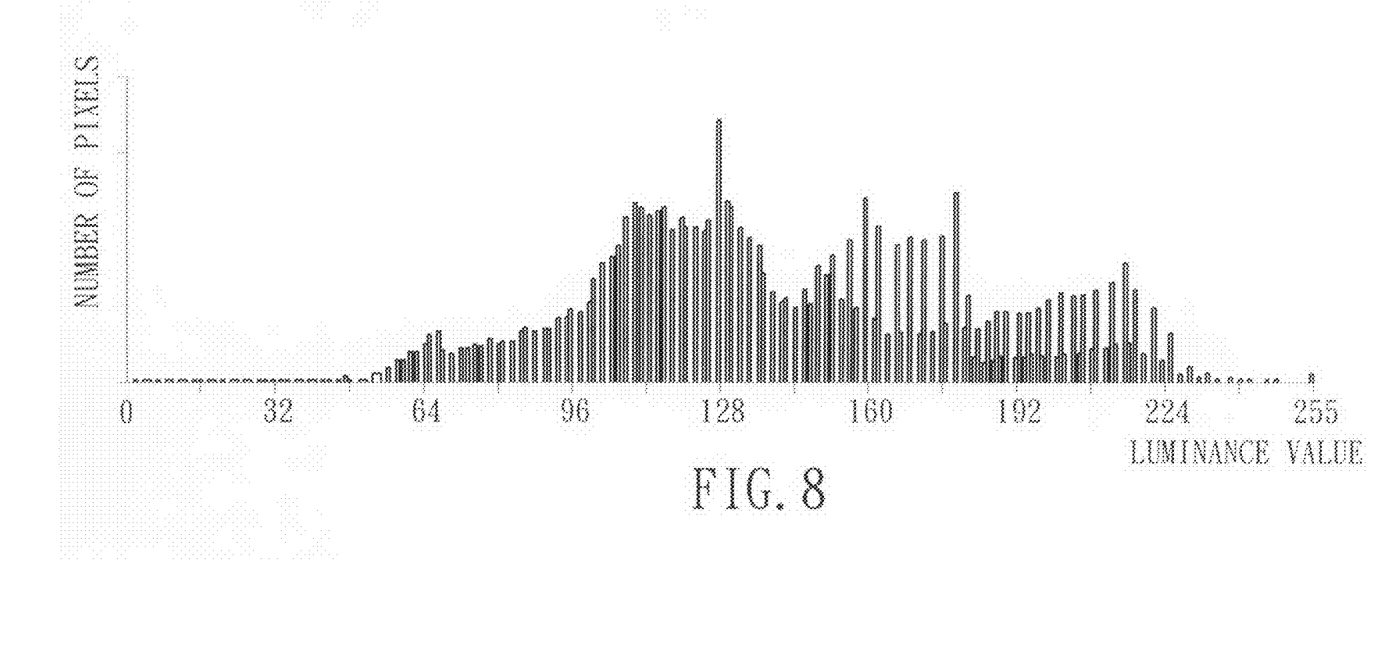
FIG. 8 is a histogram distribution plot of second luminance data generated by a luminance processing unit of the preferred embodiment.

The luminance processing unit 5 is coupled to the first converting unit 2 and the luminance mapping information generating unit 8 for receiving the first luminance data L1(n) and the luminance mapping information therefrom. The luminance processing unit 5 is operable to adjust the first luminance data L1(n) based on the luminance mapping information received thereby to generate second luminance data L2(n) corresponding to the current input image frame F1(n). According to the above example, FIG. 8 illustrates a histogram distribution of the second luminance data L2(n). As compared to the histogram distribution of the first luminance data L1(n) shown in FIG. 6, the second luminance data L2 (n) has a luminance distribution range larger than that of the first luminance data L1(n).

It is noted that, when the current input image frame F1(n) is a first one of the input image frames, i.e., n=1, the luminance mapping information output from the luminance mapping information generating unit 8 to the luminance processing unit 5 is predetermined luminance mapping information. When the current input image frame F1(n) is not the first one of the input image frames F1, i.e., n>1, the luminance mapping information output from the luminance mapping information generating unit 8 to the luminance processing unit 5 is generated in accordance with first luminance data L1(n−1) of the previous one of the input image frames, i.e., the input image frame F1(n−1), where n is an integer greater than one.

The second converting unit 7 is coupled to the first converting unit 2, the saturation processing unit 3 and the luminance processing unit 5 for receiving the hue data H(n), the second saturation data S2(n) and the second luminance data L2(n) therefrom. The second converting unit 7 converts the hue data H(n), the second saturation data S2 (n) and the second luminance data L2(n) received thereby into an output image frame F2(n) corresponding to the current input image F1(n), and outputs the output image frame F2(n) to a display (not shown).

In such a configuration, for the current input image frame F1(n), since the second saturation data S2(n) has a greater saturation distribution range than the first saturation data S1(n), the output image frame F2(n) has enhanced color saturation for human eyes as compared to the current input image frame F1(n). In addition, since the second luminance data L2(n) has a greater luminance distribution range than the first luminance data L1(n), the output image frame F2(n) has enhanced brightness contrast for human eyes as compared to the current input image frame F1(n). As a result, the real-time image processing circuit of the present invention can ensure enhanced brightness contrast and color saturation. Furthermore, the saturation mapping information generating unit 6 and the luminance mapping information generating unit 8 can generate the current saturation mapping information and the current luminance mapping information through relatively simple operations using relatively small amount of memory as compared to the prior art. Therefore, the real-time image processing circuit of the present invention can be fabricated at a relatively low cost and can rapidly process a series of input image frames in a real-time manner.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:
1. A real-time image processing circuit comprising:
a first converting unit adapted to receive an input image frame including a plurality of pixels, converting the input image frame received thereby into hue data, first saturation data and first luminance data, and outputting the hue data, the saturation data and the luminance data;
a saturation processing unit coupled to said first converting unit for receiving the first saturation data therefrom, and operable to adjust the first saturation data based on saturation mapping information to generate second saturation data corresponding to the input image frame, the second saturation data having a saturation distribution range larger than that of the first saturation data;
a luminance processing unit coupled to said first converting unit for receiving the first luminance data therefrom, and operable to adjust the first luminance data based on luminance mapping information to generate second luminance data corresponding to the input image frame, the second saturation data having a luminance distribution range larger than that of the first luminance data; and
a second converting unit coupled to said first converting unit, said saturation processing unit and said luminance processing unit for receiving respectively the hue data, the second saturation data and the second luminance data therefrom, converting the hue data, the second saturation data and the second luminance data received thereby into an output image frame corresponding to the input image frame, and outputting the output image frame.

2. The real-time image processing circuit as claimed in claim 1, further comprising:

a saturation mapping information generating unit coupled to said first converting unit and said saturation processing unit, storing the saturation mapping information therein, receiving the first saturation data from said first converting unit, and outputting the saturation mapping information stored therein to said saturation processing unit upon receiving the first saturation data from said first converting unit, said saturation mapping information generating unit being operable to generate, based on the first saturation data received thereby, current saturation mapping information that corresponds to the input image frame, and updating the saturation mapping information stored therein with the current saturation mapping information generated thereby; and a luminance mapping information generating unit coupled to said first converting unit and said luminance processing unit, storing the luminance mapping information therein, receiving the first luminance data from said first converting unit, and outputting the luminance mapping information stored therein to said luminance processing unit upon receiving the first luminance data from said first converting unit, said luminance mapping information generating unit being operable to generate, based on the first luminance data received thereby, current luminance mapping information that corresponds to the input image frame, and updating the luminance mapping information stored therein with the current luminance mapping information generated thereby.

3. The real-time image processing circuit as claimed in claim 2, wherein each of the saturation mapping information and the luminance mapping information is in the form of a histogram mapping table.

4. The real-time image processing circuit as claimed in claim 2, wherein said saturation mapping information generating unit converts the first saturation data from said first converting unit into an original saturation distribution function set of the number of the pixels of the input image frame relative to saturation strength, converts the original saturation distribution function set into a saturation cumulative distribution function set, samples equidistantly the accumulated saturation distribution function set to obtain a number (N) of comparison parameters, defines a saturation parameter function set corresponding to the saturation cumulative distribution function set, and samples equidistantly the saturation parameter function set to obtain a number (N) of reference parameters, generates a number (N) of target parameters based on the comparison parameters and the reference parameters to obtain a target distribution function set, and generates a one-to-one lookup table based on the saturation cumulative saturation distribution function set and the target distribution function set, the one-to-one lookup table serving as the current saturation mapping information.

5. The real-time image processing circuit as claimed in claim 2, wherein said luminance mapping information generating unit converts the first luminance data from said first converting unit into an original luminance distribution function set of the number of the pixels of the input image frame relative to luminance strength, converts the original luminance distribution function set into a luminance cumulative distribution function set, samples equidistantly the luminance cumulative distribution function set to obtain a number (P) of comparison parameters, defines a luminance parameter function set corresponding to the luminance cumulative distribution function set, and samples equidistantly the luminance parameter function set to obtain a number (N) of reference parameters, generates a number (P) of target parameters based on the comparison parameters and the reference parameters to obtain a target distribution function set, and generates a one-to-one lookup table based on the luminance cumulative distribution function set and the target distribution function set, the one-to-one lookup table serving as the current luminance mapping information.

* * * * *